United States Patent [19]
Wahl et al.

[11] Patent Number: 5,527,018
[45] Date of Patent: Jun. 18, 1996

[54] FILTER UNIT AND APPARATUS FOR DESLUDGING SALT BATHS

[75] Inventors: George Wahl, Rodenbach; Matthias Kremer, Wiesbaden, both of Germany; Tokuo Sato, Kamakura, Japan

[73] Assignee: Durferrit GmbH Thermotechnik, Mannheim, Germany

[21] Appl. No.: 342,581

[22] Filed: Nov. 21, 1994

[30] Foreign Application Priority Data

Jan. 13, 1994 [DE] Germany .......................... 44 00 755.8

[51] Int. Cl.⁶ ..................................... C21D 1/46
[52] U.S. Cl. ........................................ 266/120; 266/227
[58] Field of Search .................... 266/120, 227; 148/227, 228, 242, 27, 28

[56] References Cited

U.S. PATENT DOCUMENTS

| 4,448,611 | 5/1984 | Grellet et al. | 148/242 |
| 4,714,549 | 12/1987 | DiLeo | 210/224 |

FOREIGN PATENT DOCUMENTS

| 2731167 | 1/1979 | Germany . | |
| 3733721 | 4/1988 | Germany . | |
| 3836939 | 6/1989 | Germany . | |
| 9200734 | 6/1992 | Germany . | |
| 5230525 | 9/1993 | Japan | 266/120 |
| 1004618 | 9/1965 | United Kingdom | 148/228 |

OTHER PUBLICATIONS

Zwicker, Titan und Titanlegierungen, Springer–Verlag Berlin, Heidelberg, New York 1974 pp. 539–561.
Aluminium Taschenbuch, Aluminuim–Verlag GmbH Düsseldorf, 1974, p. 319.
Volk, Nickel und Nickellegierungen, Springer–Verlag Berlin, Heidelberg, New York 1970 p. 357.

*Primary Examiner*—Melvyn Andrews
*Attorney, Agent, or Firm*—Felfe & Lynch

[57] ABSTRACT

In a filter unit (25) and apparatus for desludging salt baths (1), which is flooded at least partially by the salt bath and is in working association with the upper end of a riser tube (23), the bath fluid to be desludged being driven, by means of a compressed air stream, for example, through the riser tube (23) toward the filter unit (9, 25), the filter cloth packet is made of woven wire of a nonferrous metal, preferably an alloy based on aluminum, nickel or titanium, and is surrounded by a filter frame (14), the frame (14) being shaped into a shallow, pyramidal frustum-shaped funnel (18) pointing toward the bottom of the vat, its apical bottom end being provided with a closable opening (19).

4 Claims, 4 Drawing Sheets

Number of charges

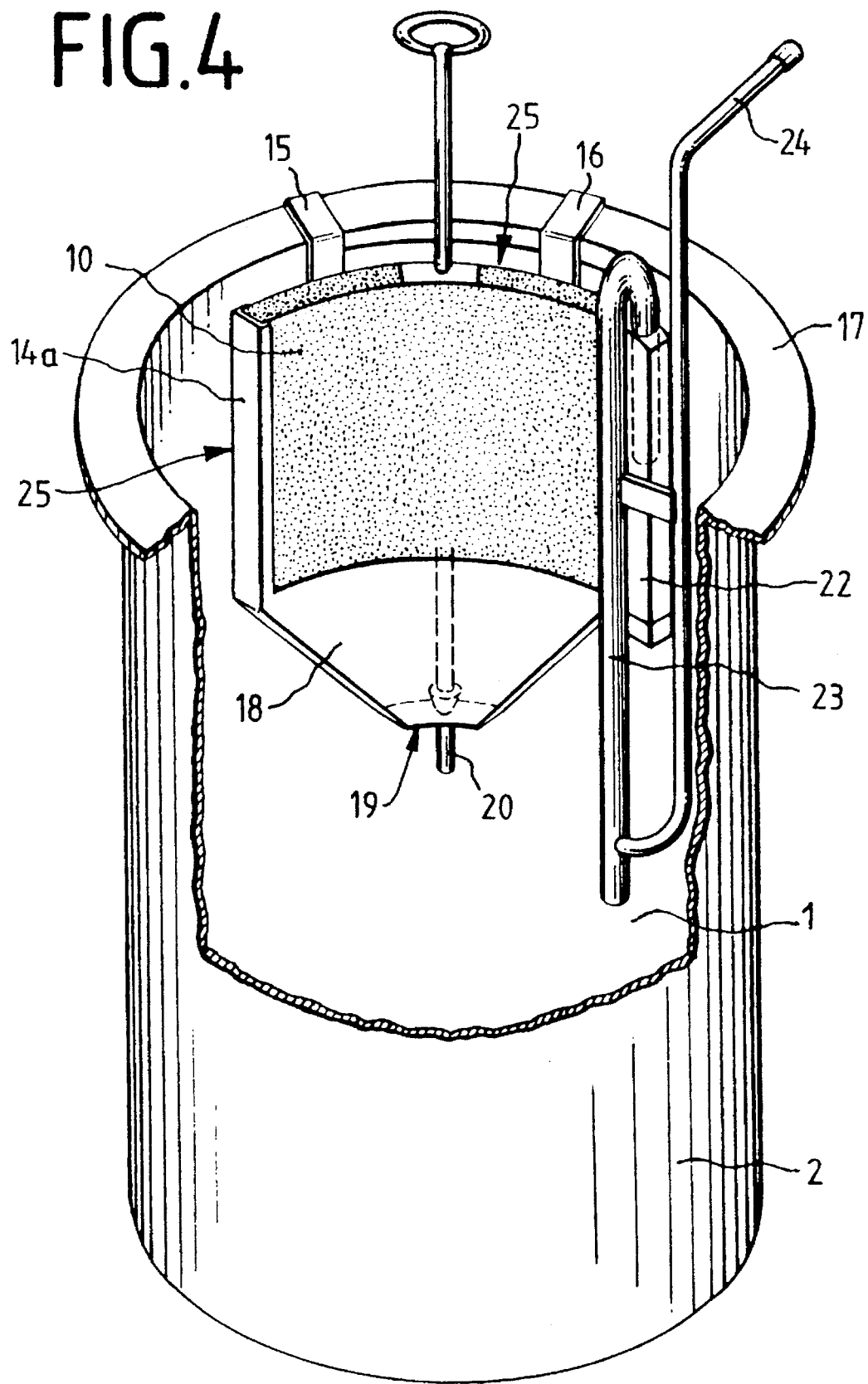

FILTER UNIT AND APPARATUS FOR DESLUDGING SALT BATHS

BACKGROUND OF THE INVENTION

The invention relates to a filter unit and apparatus for desludging salt baths, which is at least partially flooded by the salt bath and is in working connection with the upper end of a riser tube, while the bath fluid that is to be desludged is forced by means of a compressed-air stream through the riser toward the filter unit.

Salt baths are widely used, for example for the hardening or nitriding of metal materials, especially iron materials. Such salt baths consist predominantly of carbonates and cyanates of the alkali metals, and to some extent alkali cyanides are also contained in them. Such molten salts are normally operated at a temperature of 560° to 600° C.

During the treatment of components made from ferrous materials these baths form sludge in varying degrees, due to the fact that adherent steel particles, such as turning chips or grinding dusts, collect on the bottom of the treatment vessel or remain suspended in finely divided form. Likewise, the treatment of scaly or unworked surfaces (castings or forgings) leads to contamination of the bath. Lastly, sludge content is also formed by the fact that loading aids, such as baskets or frames, flake off nitride particles after many uses, which remain in the bath. The "sludge" thus formed consists mainly of iron nitride and iron oxide.

Other salt baths, such as quenching baths on a hydroxide basis, become increasingly thick due to the formation of insoluble carbonates, causing the melting point of the baths to increase and the quenching effect to diminish. Therefore salt baths of this kind must also be cleaned up.

Since the sludge content of the nitriding bath has a great influence on the repeatability of the results of the nitridation, a constant cleaning of the bath is very important. In practice, a variety of desludging apparatus are used for the purpose. All of the former systems have it in common that their operation has to be interrupted for desludging, i.e., the desludging must be performed on an unloaded bath.

DE-OS 29 11 222 discloses an apparatus for the continuous desludging of salt baths, which consists of a filter unit, a pump immersed in the salt bath, and a riser tube. The filter unit is in this case disposed outside of the salt bath.

Also known is an apparatus for the discontinuous desludging of salt baths serving for the treatment of metals, consisting of a pumping tube, an air feed line and a filter unit (DE 38 36 939) in which glass wool or woven iron screens with a mesh size of 0.05 to 0.5 mm are used as filter materials.

Woven screens of iron wire, however, have the disadvantage that the iron material is severely attacked—embrittled for example—by the salt bath itself and also by the substances contained in the filter sludge, so that after a few hours of operation the screen tears or breaks open or develops holes, with the result that the retained filter sludge pours through into the cleaned bath and abruptly renders it unusable.

Also known (DAS 27 31 167) is the use of inorganic molded materials, especially glass wool or rock wool, for the cleaning of molten salt baths, especially for the removal of harmful suspended substances and settled sludge in baths for the structural treatment of ferrous materials. These glass wool or rock wool filters, however, have the disadvantage among others that they are hard to dispose of when contaminated, so that they are impractical for reasons of cost.

Lastly, a filtering means with an electrogalvanically built-up filter medium is known (DGM 92 00 734.1), wherein the filter medium is made from nickel or a nickel alloy and has a thickness of 0.1 to 0.2 mm. This known filter medium, however, in the form of a pressure screening fabric, is suitable only as a multi-stage separating system, a band filter for example, which is connected to the output of hydrocyclones.

SUMMARY OF THE INVENTION

The present invention is addressed to the problem of creating not only a filter unit for desludging salt baths, whose useful life is substantially longer than that of the conventional filter units, but also the apparatus corresponding to this filter unit, which can be made especially cheaply and operates with a high degree of efficiency.

This problem is solved according to the invention inasmuch as the filter fabric enveloped by a filter basket is made from a filter cloth made of a woven wire of a nonferrous metal, preferably of an alloy on an aluminum, nickel or titanium basis. In accordance with the invention, all alloys are suitable for the filter fabric in which any metal, with the exception of iron, makes up the greatest single component. The apparatus necessary for the filter unit is formed from a frame shaped into a funnel toward the bottom of the salt bath, the pointed bottom end of which is provided with an opening which can be closed with a stopper rod.

The invention admits of a great variety of embodiments; one of them is shown in the appended drawings, wherein:

FIG. 1 is a perspective view of a filter unit and according to the invention, together with the salt bath tank, FIG. 2 is a perspective view of the filter unit itself according to FIG. 1, FIG. 3 is a diagrammatic representation of a desludging procedure through 34 charges, the iron content of the charge being given in %, FIG. 4 is a perspective view of an alternative embodiment of a filter unit together with the pump unit and the salt bath tank, and FIGS. 5, 6, 7 are perspective views of the pump unit, the filter unit and the stopper, respectively, in the embodiment according to FIG. 4.

DETAILED DESCRIPTION OF THE PREFERRED EMBODIMENTS

Figure 1:
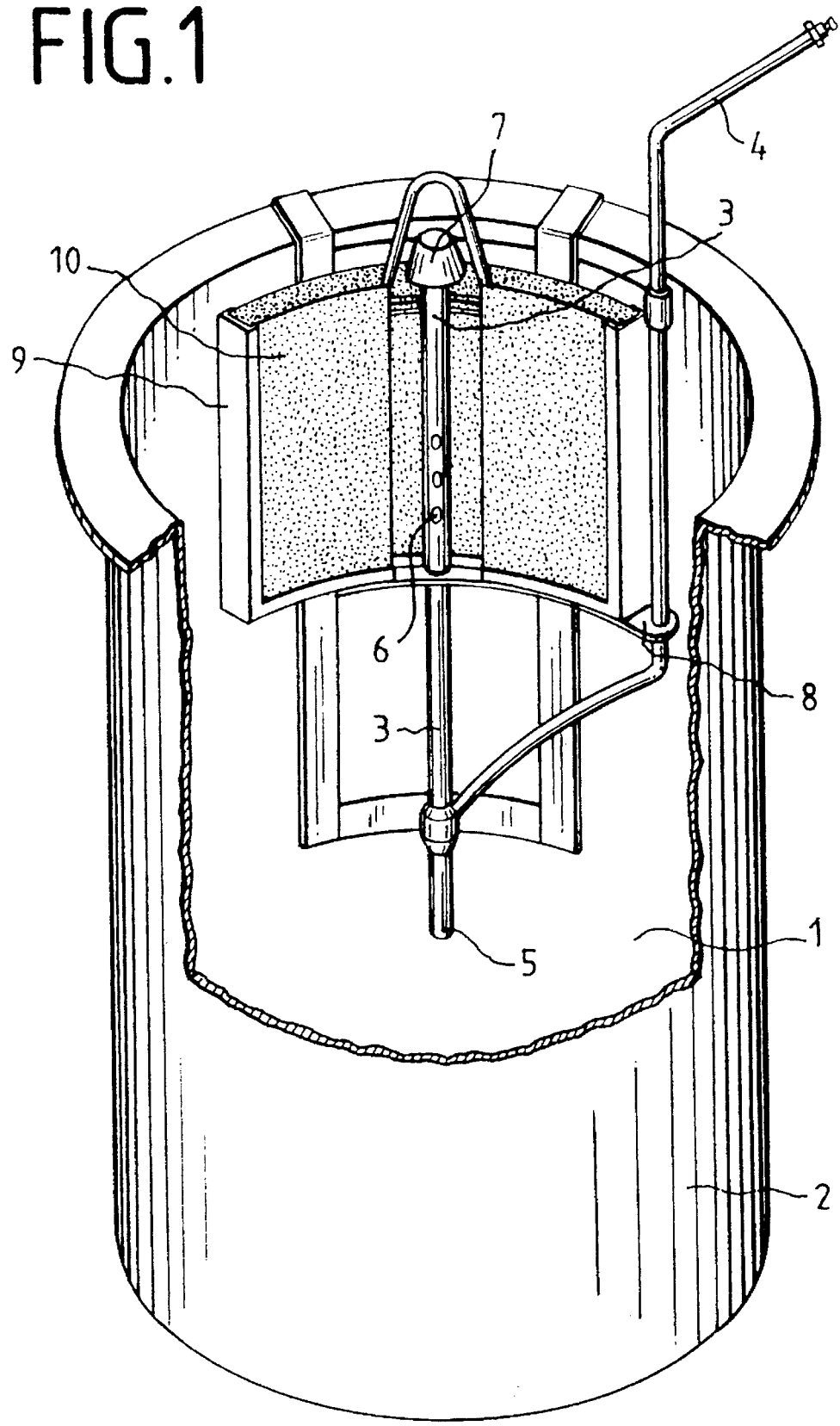

The molten salt 1, which is situated in a vat 2, is continuously pumped through a riser tube 3 into the filter unit 9 where a sheet metal spreader 7 is cupped over the upper end of the riser tube 3.

The molten salt 1 is driven by means of the air stream rising in the salt. The air is delivered through a compressed air feed line 4, while the aspirating tube 5 draws the sludge from the lowermost point in the vat 2. The filter is held by an abutment 8 and is easily replaceable. Beneath the surface of the salt bath the riser tube 3 is provided with a number of holes 6 which serve to relieve pressure if the filter 9 or the upper end of the riser tube 3 becomes clogged. The holes 6 have a diameter, for example, of 2 to 16 mm, depending on the riser tube diameter, and they are located below the bath surface.

After leaving the riser tube 3, the molten stream driven upward by the air stream strikes against the inside surface of the bell-shaped spreader 7 and is steered by the latter into the pack of woven aluminum wire 10. After being cleaned the molten stream seeping through the filter pack 10 flows back into the salt melt.

Figure 2:
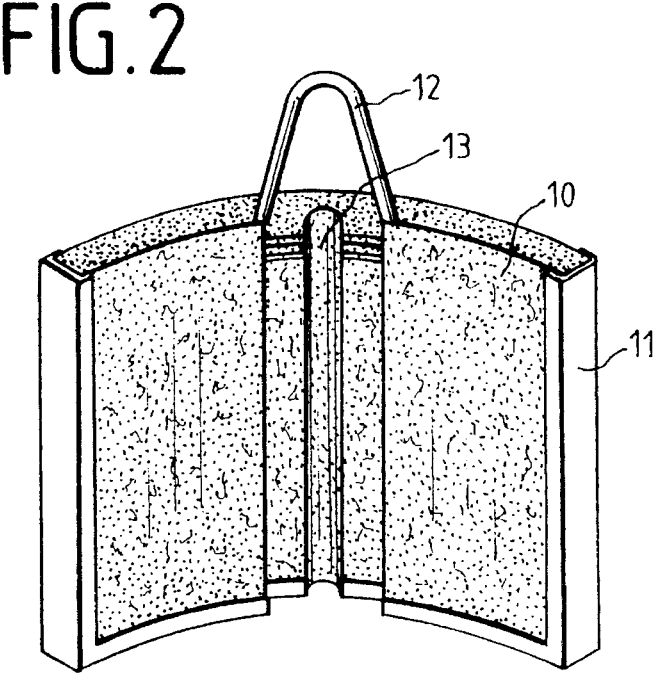

FIG. 2 shows a separate filter unit which includes a box-like frame 11, the filter pack 10 composed of aluminum wire cloth surrounded by the frame 11, a hanger loop 12 and a trough-like recess 13 to accommodate the riser tube 3. The filter unit 9 can be raised easily at any time, from the bath or from the holding frame 8.

Figure 3:
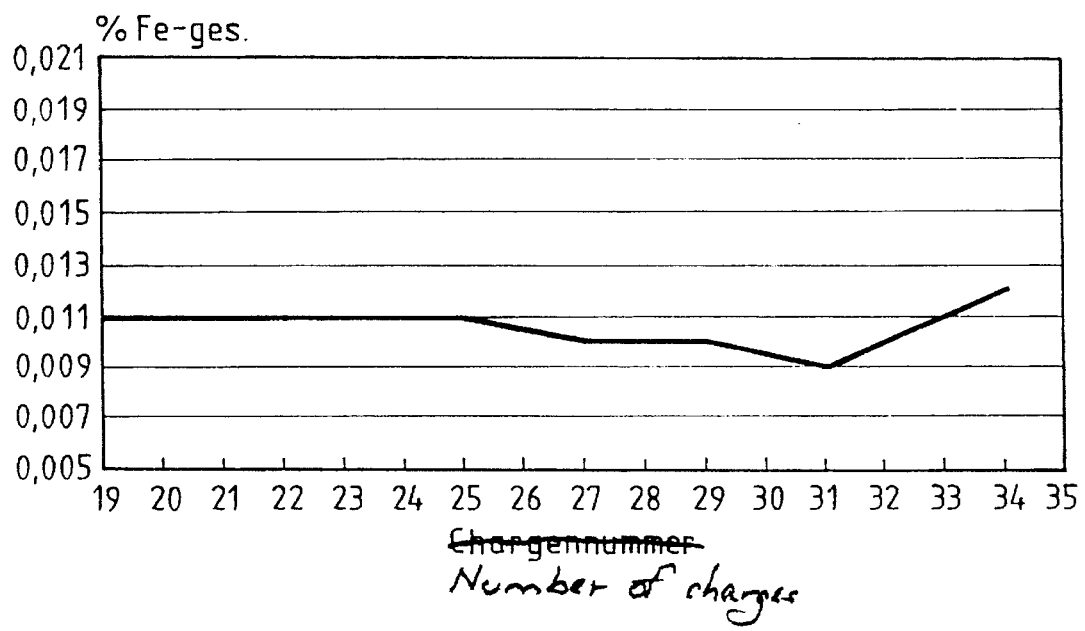
Figure 6:
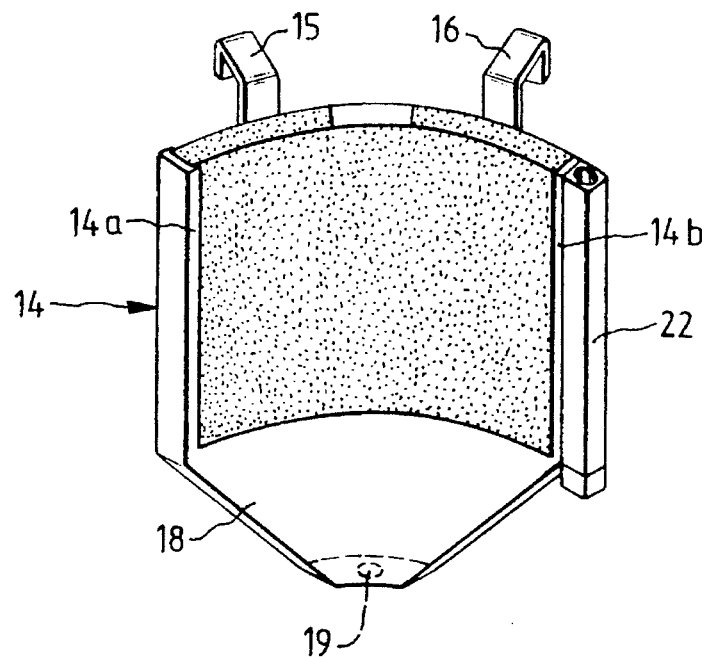
Figure 7:
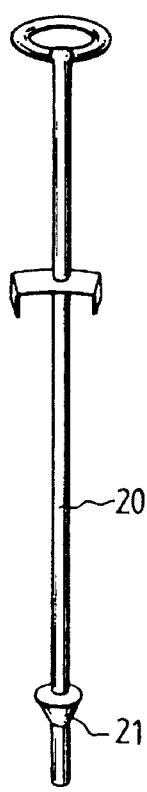
Figure 5:
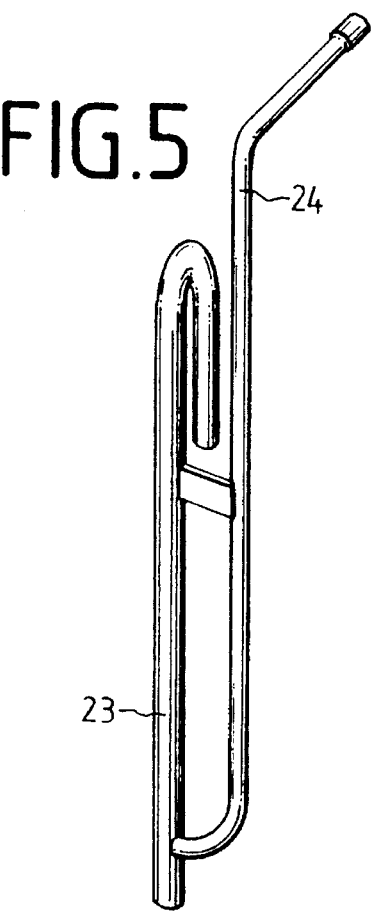

FIG. 3 shows in a diagram the result of a series of tests, in which the salt bath was cleaned by means of a filter unit made of a pure aluminum wire cloth. The curve shows that the content of iron particle sludge has remained extraordinarily low even after the treatment of 34 charges, and up to about the 25th charge has the very low level of 0.011% Fe, and even after that another phase falls to a still better level (0.009% Fe), until at the end it rises again to a level that is slightly above the starting level. The woven filter pack should have between 200 and 800 meshes/cm$^2$. The mesh size used in this experiment was 400 meshes per square centimeter.

In the embodiment represented in FIG. 4 the filter pack of aluminum wire cloth 10 is held by a frame 14 which in turn is supported by means of the hooks 15 and 16 on the edge 17 of the salt bath vat 2. The frame 14 encompasses with its two side parts 14a and 14b the mattress-like filter pack 10 and also has a downwardly pointing sheet-metal funnel 18 which is provided at its bottom end with an opening 19 which can be closed with a stopper rod 20 provided for this purpose with a conical stopper 21. The side part 14b is equipped with a collector box 22 through which the fluid that is pumped through the riser tube 23 can flow transversely into the filter pack 10 through the side part 14b. The sheet-metal funnel 18 provided below the filter pack serves to catch the filter sludge which sinks down from the filter pack. The collected sludge can be let out by raising the stopper rod 20 above the opening 19 at the tapered bottom end of the sheet-metal funnel 18. The pump (ejector pump) formed by the riser tube 23 and the compressed air feed tube 34 serves to pump the fluid out of vat 2 into the collector box 22.

While there have been described what are considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An apparatus for desludging a bath of molten salt, said apparatus comprising a vat for containing a bath of molten salt, a riser tube in said vat, means for supplying a compressed air stream to said riser tube in order to drive said molten salt through the riser tube, and a filter unit for receiving molten salt from the riser tube and returning it to the bath in which said filter pack is at least partially immersed, said filter unit comprising a filter pack formed of woven wire bounded by a filter frame, the filter pack being of a nickel-based alloy.

2. Apparatus according to claim 1, in which the woven filter pack has a number of meshes/cm$^2$ between 200 and 800 meshes/cm$^2$.

3. An apparatus as in claim 1 wherein said frame comprises a funnel below said filter pack and having an apical bottom end provided with an opening, said apparatus further comprising a stopper for said opening.

4. An apparatus as in claim 3 wherein said frame further comprises a collector box which receives molten salt from said riser tube and introduces said molten salt into said filter pack horizontally.

\* \* \* \* \*